(12) United States Patent
Rose et al.

(10) Patent No.: US 8,158,292 B2
(45) Date of Patent: Apr. 17, 2012

(54) FUEL CELL SYSTEM AND METHOD OF USING THE SAME

(75) Inventors: Lawrence M. Rose, Berkley, MI (US); Suriyaprakash Ayyangar Janarthanam, Westland, MI (US); Alexander T. Zaremba, Dearborn Heights, MI (US); Craig Winfield Peterson, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/902,215

(22) Filed: Oct. 12, 2010

(65) Prior Publication Data

US 2011/0165480 A1   Jul. 7, 2011

(51) Int. Cl.
*H01M 8/06* (2006.01)
*H01M 8/02* (2006.01)
(52) U.S. Cl. .................... 429/415; 429/410; 429/411
(58) Field of Classification Search .................. 429/410, 429/411, 415
See application file for complete search history.

(56) References Cited

U.S. PATENT DOCUMENTS

| | | | |
|---|---|---|---|
| 6,939,633 B2 | 9/2005 | Goebel | |
| 7,141,324 B2 | 11/2006 | Margiott et al. | |
| 7,425,379 B2 | 9/2008 | Joos | |
| 2005/0136302 A1 | 6/2005 | Shoji et al. | |
| 2007/0026277 A1 | 2/2007 | Ogawa et al. | |
| 2007/0031710 A1* | 2/2007 | Ushio et al. ............ | 429/25 |
| 2007/0087233 A1 | 4/2007 | Blaszczyk et al. | |
| 2007/0099040 A1 | 5/2007 | Morita et al. | |
| 2007/0122664 A1 | 5/2007 | Spare | |
| 2008/0206610 A1 | 8/2008 | Saunders et al. | |
| 2008/0233443 A1 | 9/2008 | Jacobsen et al. | |
| 2008/0286613 A1 | 11/2008 | Furukawa | |

* cited by examiner

*Primary Examiner* — Gregg Cantelmo
(74) *Attorney, Agent, or Firm* — Brooks Kushman P.C.

(57) ABSTRACT

In at least one embodiment, a fuel cell anode exhaust system includes a fuel cell anode having an input and an output. The system also includes a first conduit loop communicating with the anode input and output. The system also includes a second conduit loop having an input and an output. The input and output communicate with the first conduit loop. A gas separator is disposed on the second conduit loop for purifying an exhaust stream fed into the gas separator.

20 Claims, 3 Drawing Sheets

FUEL CELL SYSTEM AND METHOD OF USING THE SAME

BACKGROUND

1. Technical Field

One or more embodiments of the present invention relate to a fuel cell system and a method for using the same.

2. Background Art

In a typical proton exchange membrane (PEM)-based fuel cell system, an anode provides hydrogen fuel at the pressure, flow, and humidity from an anode side to a cathode side of a fuel cell stack for power generation.

SUMMARY

In at least one embodiment, a fuel cell anode exhaust system includes a fuel cell anode having an input and an output. The system further includes a recirculating conduit communicating with the anode input and output. The system also includes a remediation conduit loop having an input and an output. The input and output communicate with the recirculating conduit. A gas separator is disposed on the remediation conduit loop for purifying an exhaust stream fed into the gas separator.

In another embodiment, a fuel cell anode exhaust system includes a conduit having a gas input and a gas output. The system also includes a conduit loop having an input and an output and a gas separator therebetween increasing the purity of a gas mixture fed from the gas input. The loop input is connected to the conduit downstream of the gas input of the conduit. The loop output is connected to the conduit upstream of the gas output of the conduit.

In yet another embodiment, a method of remediating a fuel cell anode exhaust includes the steps of splitting a portion of a gas mixture comprising fuel and an impurity from a recirculation loop into a remediation stream and a recirculating stream. The loop is connected to an input and an output of a fuel cell anode. The method also includes the step of pressurizing the remediation stream into a charging side of a gas separator. The remediation stream is separated into the fuel and the impurity through a selectively permeable membrane. The fuel is directed into a purified fuel stream which then is provided to the recirculating stream to remediate the fuel cell anode exhaust.

DETAILED DESCRIPTION

Reference will now be made in detail to compositions, embodiments and methods set forth herein, which include the best mode of practicing the invention presently known to the inventors. But, it should be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the operating examples, or where otherwise expressly indicated, all numbers in this description indicating material amounts, reaction conditions, or uses are to be understood as modified by the word "about" in describing the invention's broadest scope. Practice within the numerical limits stated is generally preferred. Also, unless expressly stated to the contrary:

percent and ratio values are by weight;

a material group or class described as suitable or preferred for a given purpose in connection with the invention implies any two or more of these materials may be mixed and be equally suitable or preferred;

constituents described in chemical terms refer to the constituents at the time of addition to any combination specified in the description, and does not preclude chemical interactions among mixture constituents once mixed;

an acronym's first definition or other abbreviation applies to all subsequent uses here of the same abbreviation and mutatis mutandis to normal grammatical variations of the initially defined abbreviation; and unless expressly stated to the contrary, measurement of a property is determined by the same technique as previously or later referenced for the same property.

Figure 1:
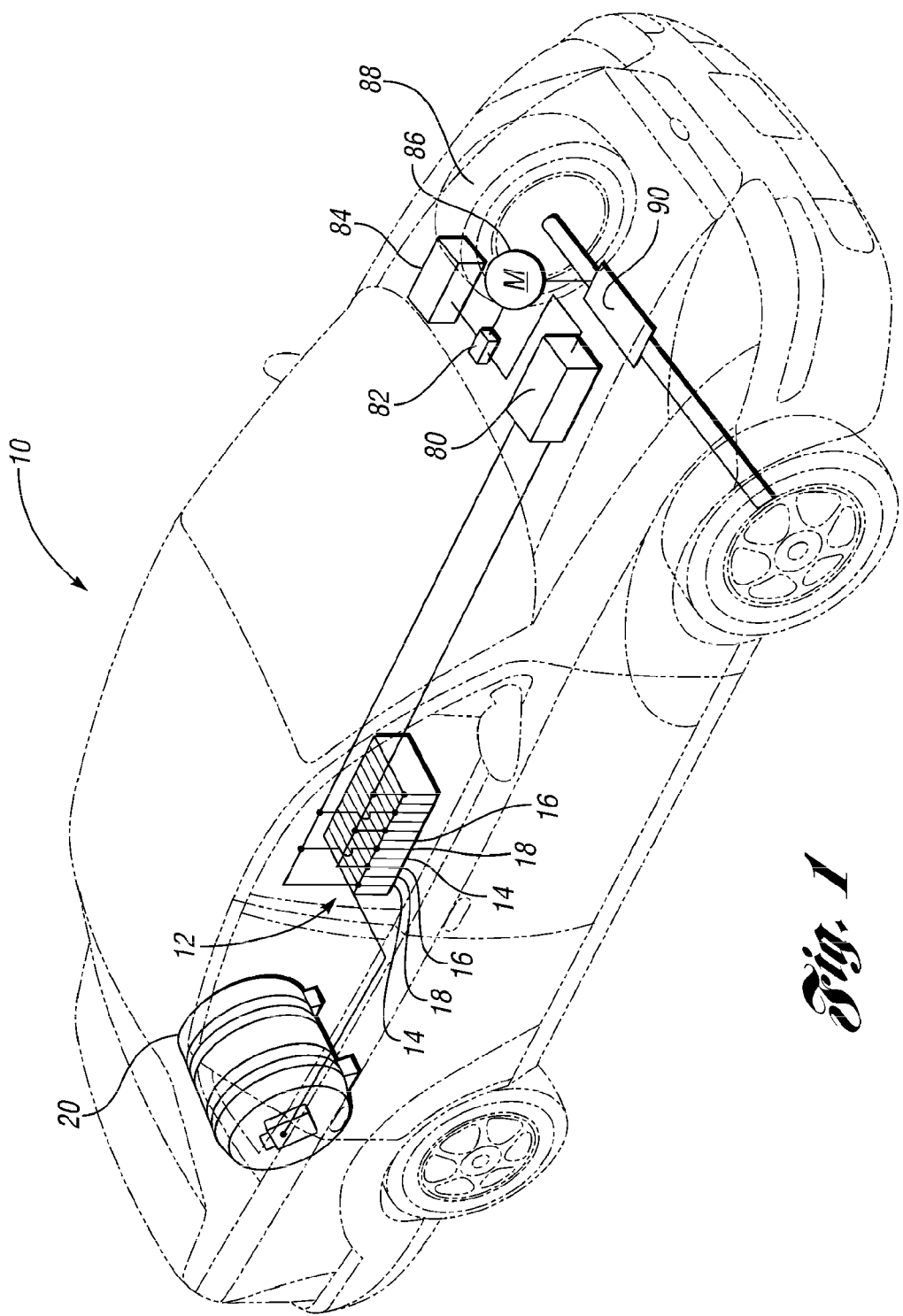
FIG. 1 schematically illustrates a fuel cell in a vehicle according to at least one embodiment.

Regarding FIG. 1, a vehicle 10 is illustrated with a fuel cell 12 for powering the vehicle 10. While the vehicle 10 shown is a car, it should be understood that the vehicle 10 may also other forms of transportation such as a truck, off-road vehicle, or an urban vehicle. The fuel cell 12 comprises an anode 14, a cathode 16, and a membrane 18 therebetween.

Fuel cell 12 electrically communicates with and provides energy to a high voltage bus 80. High voltage bus 80 electrically communicates with and provides energy to a d.c.-to-d.c. converter 82. The d.c.-to-d.c. converter 82 electrically communicates with both a battery 84 and a traction motor 86. The traction motor 86 is connected to a wheel 88 connected to the vehicle's 10 frame 90.

Further, while the fuel cell 12 is illustrated as supplying power for the traction motor 86, the fuel cell 12 may be used to power other aspects of the vehicle 10 without departing from the spirit or scope of the invention.

Connected directly or indirectly to the fuel cell 12 is a primary fuel source 20, such as a primary hydrogen source. Non-limiting examples of the primary hydrogen source is a high-pressure hydrogen storage tank or a hydride storage device.

Figure 2:
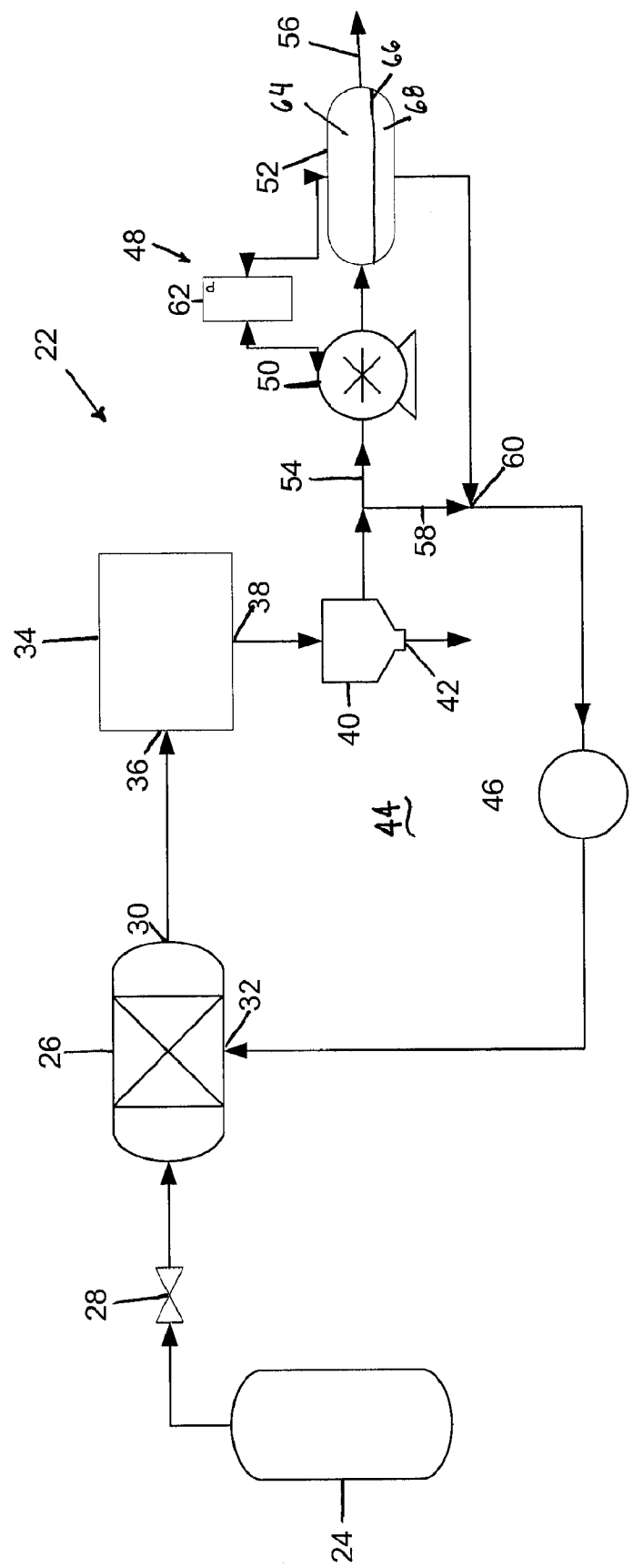
FIG. 2 schematically illustrates a portion of a fuel cell system according to at least one embodiment.
Figure 3:
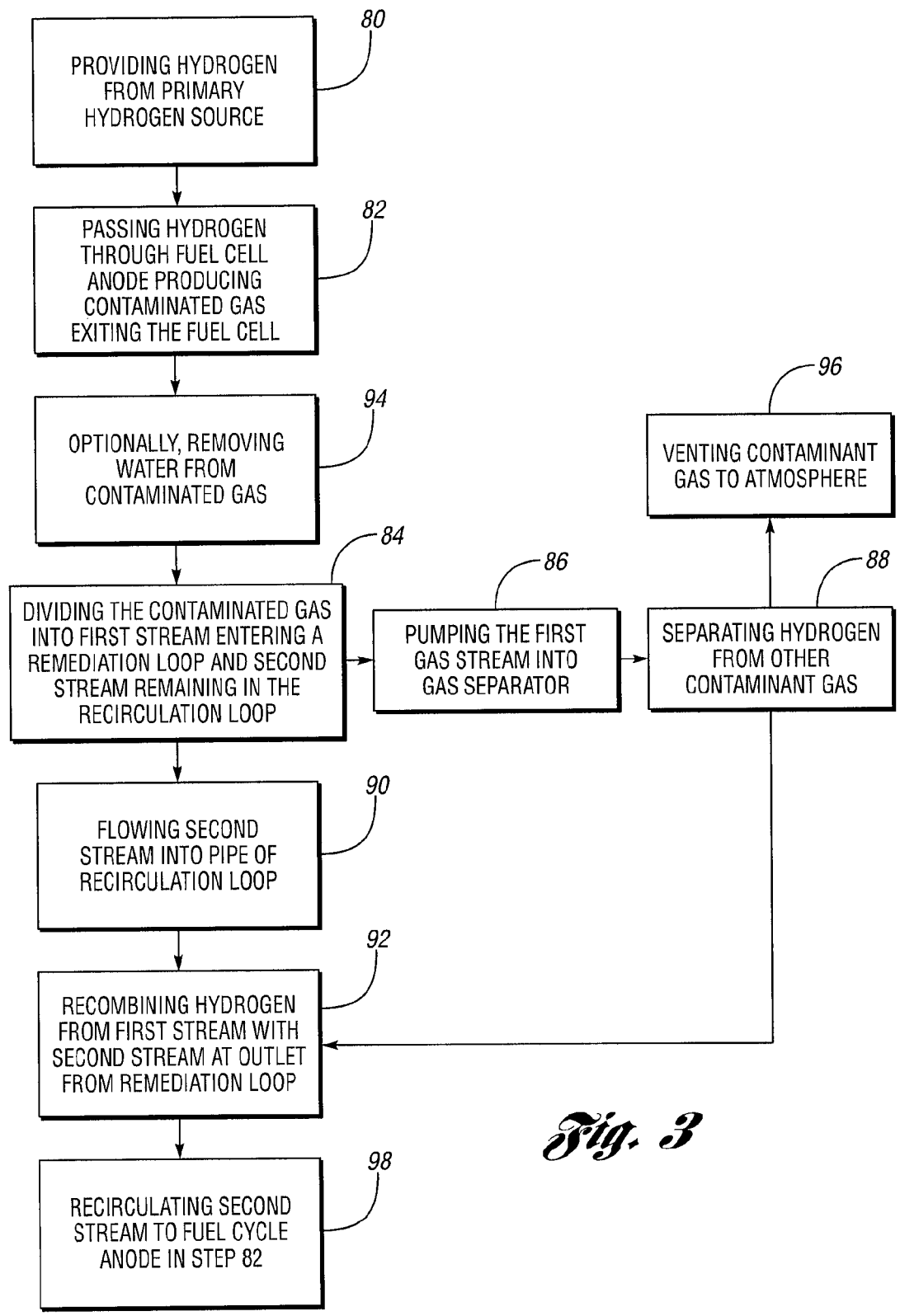
FIG. 3 schematically illustrates a flow diagram for use of the fuel cell system according to at least one embodiment.

Regarding FIG. 2, a fuel cell system 22 is schematically illustrated as a process flow diagram according to at least one embodiment of the present invention. A high-pressure hydrogen storage tank 24 connects to a mixing chamber 26 with a system isolation valve 28 disposed therebetween. The mixing chamber 26 has an output 30 and input 32. The output 30 is connected to the fuel cell anode 34 at an input 36. An output 38 of the fuel cell anode 34 is connected directly or indirectly with an optional water knock-out device 40. The water knock-out device 40 is connected directly or indirectly to the mixing chamber input 32. The water knock-out device 40 is also connected to a vent 42 to an atmosphere external to the fuel cell system 22.

The fuel cell output 38 and the mixing chamber input 32, including the optional water knock-out device 40, comprises a recirculation loop 44. Situated on the recirculation loop 44 is an anode recirculation device 46 and a remediation loop 48, comprising an optional positive displacement pump 50 and a gas separator 52.

In at least one embodiment, a first flow of the anode gas mixture enters the remediation loop 48 at the input 54, situated between the water knock-out device 40 and the positive displacement pump 50. The first flow of anode gas mixture is remediated in gas separator 52 to generate a remediated gas mixture relatively enriched in hydrogen, and to expel waste gas, such as nitrogen, through a vent 56. A second flow of the anode gas mixture continues in the recirculation loop 44 through a conduit 58, such as a pipe.

The remediated gas mixture recombines with the second flow of gas at the junction of conduit 58 with an output 60 of the remediation loop 48.

It should be understood that the output 60 of remediation loop 48, while illustrated as reconnecting with conduit 58, may reconnect with the fuel cell system at substantially any point in the fuel cell system without exceeding the scope and spirit of the embodiments set forth herein. Non-limiting examples of points of reconnection of the output 60 may include with the recirculation loop 44, the conduit situated between the mixing chamber 26 and the input 36, the fuel cell anode 34, mixing chamber 26, and/or the conduit between the primary hydrogen source 24 and mixing chamber 26. In certain embodiments, there may be a plurality of inputs 54 and outputs 60 for the remediation loop 44 without exceeding the scope and spirit of contemplated embodiments.

In at least one embodiment, positive displacement pump 50 transfers the anode gas mixture to the gas separator 52 from the input 54. In certain embodiments, the positive displacement pump 50 is triggered into operation by a detecting mechanism 62. Non-limiting examples of the detecting mechanism include a pressure detecting device, as illustrated in FIG. 2, or a timer. In another embodiment, pump 50 acts as a controller when either receiving a signal from a hydrogen gas sensor and/or achieving a threshold value supplied by a signal generator using a hydrogen concentration estimation algorithm.

In at least one embodiment, using the pressure detecting device pump 50 is activated if a pressure on the separator is measured by the pressure detecting device to be less than 5 bar. In another embodiment, pump 50 is deactivated if the pressure on the separator is measured to be greater than 7 bar.

In at least one embodiment, the gas separator 52 includes a first chamber for unpurified gas 64, a membrane 66, and a second chamber for purified gas 68. The first chamber is adjacent to one side of the membrane. The second chamber is adjacent to a second side of the membrane 66, the first side being spaced apart from the second side.

Connected to the first chamber 64 is the vent 56 connected to an external atmosphere. In one embodiment, when using a pressure detecting mechanism, a gas pressure in the first chamber 64 is measured against a predetermined threshold gas pressure. When the threshold gas pressure is exceeded, the vent 56 is opened expelling the unpurified gas mixture in the first chamber 64. The unpurified gas mixture is intended to be relatively enriched in contaminant gases, such as nitrogen, and include a minimal amount of a fuel, such as hydrogen.

In at least one embodiment, when the detecting mechanism 62 is a timer, the positive displacement pump 50 is triggered after a predetermined delay time period. The delay time period may range from 5 minutes to 300 minutes in at least one embodiment. In another embodiment, the delay time period may range from 5 minutes to 60 minutes.

In yet another embodiment, the delay time period may range from 1 hour to 5 hours. It is understood that the delay time may vary with factors such as a membrane's thickness, a membrane's material, a purification level in the anode gas mixture, and an operational load on the fuel cell.

The use of a timer mechanism is advantageous in at least one embodiment when the fuel cell system 12 is operating in a relatively stable process condition and/or a stable operation period.

It should be understood that in at least one embodiment a plurality of detecting mechanisms 62 may be advantageous and does not exceed the scope or the spirit of the contemplated embodiment set forth herein. For example, a pressure detecting mechanism may be advantageous during an unstable operating time period, such as during start-up of vehicle 10 or after a prolonged stoppage time period of vehicle 10; while a timer mechanism may be suitable for the stable operation time period.

In at least one embodiment, the gas separator may include a nitrogen-hydrogen gas separator. Non-limiting examples of the nitrogen-hydrogen gas separator include a palladium-based micro-membrane gas separator, a hollow polysulfone fiber membrane gas separator, a chemical vapor deposited porous substrate hydrogen gas separator, and/or a membrane gas separator.

When using a fuel system with a remediation loop 48, the steps may include (a) providing hydrogen from a primary hydrogen source in step 80;

(b) passing the hydrogen through a fuel cell anode in step 82, which may introduce a contaminant gas such as nitrogen and/or water vapor, into the hydrogen to form a contaminated gas mixture;

(c) dividing in step 84 the contaminated gas mixture into a first gas stream and a second gas stream, the first gas stream entering the remediation loop and the second gas stream remaining in the recirculation loop in step 90;

(d) pumping the first gas stream of the contaminated mixture in the remediation loop through the pump into the gas separator in step 86, when the pump is triggered by the timing mechanism;

(e) separating the hydrogen from the other contaminant gases in the gas separator in step 88 by allowing the hydrogen to pass from the first chamber of the gas separator through the membrane into the second chamber of the gas separator and exiting the second gas chamber of the separator toward the output of the remediation loop;

(f) recombining the purified hydrogen gas in step 92 with the second stream of the contaminated gas at the output of the remediation loop to form a gas mixture having a reduced contaminant amount.

In at least one embodiment, the method includes the additional step of removing water vapor 94 by passing the contaminated gas mixture through the water knock-out device.

In at least one embodiment, the gas remaining in the first chamber 64 is vented to the external atmosphere in step 96 through vent 56.

EXAMPLE

In at least one embodiment, the gas mixture having the reduced contaminant amount is recirculated to the fuel cell anode in step 98.

In at least one embodiment, a quantity of energy saved using embodiments of the fuel cell system with the remediation loop is more substantial than would have been expected relative to an open-loop purging fuel cell system.

A separator energy analysis and membrane selection illustrates the surprising energy conservation of at least one embodiment. A $N_2$ separator energy balance is evaluated using Federal Urban Driving Schedule (FUDS) cycle. A FUDS purge gas result is calculated as follows:

a) $H_2$ purges 1.6 g using a detecting mechanism based strategy, and 3.5 g using an open loop strategy;

b) $N_2$ crossover from the cathode is 20 g.

An $N_2$ average crossover flow at standard temperature and pressure (STP) condition is $$\dot{m}_{c,N_2} = \frac{m_{c,N_2} R T_0}{\mu_{N_2} P_0} \cdot \frac{3600}{1372} \approx 0.05 \; \frac{m^3}{h} \quad [1]$$

Where $T_0$ and $P_0$ are the temperature and pressure of the purge gas at initial conditions, a $N_2$ separator should support such $N_2$ crossover rate, h is an operational time in hours, $\mu_{N_2}$ is the molecular weight of nitrogen, $m_{C,N_2}$ is the amount of $N_2$ crossover during the 1372 sec cycle period, and R is a universal gas constant. The selection of separator is described below.

Also for the purposes of pump duty cycle, assume an average 40% $N_2$ concentration in the contaminated gas. This gives the pump gas inlet flow at STP conditions $$\dot{m}_{pump} = \frac{.05 \; \frac{m^3}{h}}{.4} = 0.125 \; \frac{m^3}{h} \quad [2]$$

Using a model NM-B01A gas separator membrane supplied by UbeAmerica, Inc. (New York, N.Y.), a uses a contaminated gas chamber pressurized to 7 bar. The ratio of the $N_2$ crossover flow to the separator flow capability defines the separator duty cycle:

$$S_{PWM} = \frac{.05 \; \frac{m^3}{h}}{.07 \; \frac{m^3}{h}} = 0.714 \quad [3]$$

The pump is a separator compressor model LOA-101-JR supplied by Gast Manufacturing Inc. (Benton Harbor, Mich.).

The pump is capable of supplying 7 bar flow at a pump output rate 0.1699 $m^3/hr$ and a pump inlet rate 1.1893 $m^3/hr$. The current draw at 7 bar set point is I=9A with a voltage of 12V.

Using the flow from [1], a pump duty cycle equals $$S_{pump,PWM} = \frac{0.125 \; \frac{m^3}{h}}{1.19 \; \frac{m^3}{h}} = 0.105 \quad [4]$$

or $$S_{pump,PWM} \approx 10.5\% \quad [5]$$

An average cycle pump power is $$P_{pump} = 9*12*0.105 = 11.35 W \quad [6]$$

A lost energy rate from a purge vented to the external atmosphere equals $$P_{purge} = \frac{0.0016 \; kg}{0.002 \; \frac{kg}{mole}} \frac{2.41e5 \; \frac{J}{mole}}{1372 \; sec} = 140.5 \; W \quad [7]$$

The lost energy rate from the purge, in at least one embodiment ranges from 30% to 60% of a lost energy rate from an open loop purging where the hydrogen is vented at the same ratio to contaminated gases as found in the contaminated gas mixture.

While certain contemplated embodiments have been illustrated and described, it is not intended that these embodiments illustrate and describe all possible forms of the invention. Rather, the words used in the specification are words of description rather than limitation, and it is understood that various changes may be made without departing from the spirit and scope of contemplated embodiments.

What is claimed:

1. A fuel cell anode exhaust system for use in remediating an anode gas mixture and forming a remediated gas mixture, the system comprising:
   a fuel cell anode having an input and an output;
   a recirculating conduit loop communicating with the anode input and output;
   a remediation conduit loop having an input and an output, the input and output communicating with the recirculating conduit loop; and
   a gas separator disposed on the remediation conduit loop, the separator being adapted to remediate at a positive pressure the anode gas mixture entering into the gas separator from the remediation conduit loop and to release the remediated gas mixture to the output of the remediation conduit loop.

2. The system of claim 1, further comprising a pump disposed between the input to the remediation conduit loop and the gas separator, the pump being adapted to supply the positive pressure.

3. The system of claim 1, wherein the input of the remediation conduit loop is disposed upstream of the output of the remediation conduit loop.

4. The system of claim 1, further comprising a splitter formed where the input to the remediation conduit loop connects to the recirculating conduit loop.

5. The system of claim 4, wherein the splitter is disposed upstream of the output of the remediation conduit loop into the recirculating conduit loop.

6. The system of claim 1, further comprising a detecting device for operating the pump, the detecting device communicating with the pump and the gas separator.

7. The system of claim 2, further comprising a timer adapted to communicate with the pump and signal a transition to a pump operating state producing the positive pressure after a predetermined time delay.

8. The system of claim 6, wherein the detecting device is a sensor.

9. The system of claim 1, further comprising a vent disposed on the gas separator, the gas separator being purgable to an external atmosphere through the vent.

10. The system of claim 1, wherein the gas separator is a hydrogen-nitrogen gas separator.

11. The system of claim 1, wherein the positive pressure ranges from 5 bar to 7 bar.

12. The system of claim 2, wherein the pump is adapted to receive a signal from a hydrogen gas sensor, the pump being adapted to change operating states when the signal is received.

13. The system of claim 2, wherein the pump is adapted to receive a signal from a signal generator using a hydrogen concentration algorithm, the pump being adapted to change operating states when the signal is received.

14. A fuel cell anode exhaust system for use in remediating an anode gas mixture and forming a remediated gas mixture, the system comprising:
   a fuel cell anode having an input and an output;
   a recirculating conduit loop communicating with the anode input and output;
   a remediation conduit loop having an input and an output, the input and output communicating with the recirculating conduit loop;
   a pump situated in the remediation conduit loop; and
   a gas separator disposed on the remediation loop and situated downstream and spaced apart from the pump, the gas separator being adapted to remediate at a positive pressure ranging from 5 bar to 7 bar the anode gas mixture entering into the gas separator from the remediation conduit loop input and to release the remediated gas mixture to the output of the remediation conduit loop.

15. The system of claim 14, further comprising:
   a mixing chamber communicating with the fuel cell anode input; and
   a hydrogen storage tank communicating directly with the mixing chamber supplying hydrogen, the mixing chamber also communicating with the remediated gas mixture.

16. The system of claim 14, wherein the pump is configured for control by a detecting mechanism selected from the group consisting essentially of a pressure sensor, a hydrogen sensor, and a signal generator having a hydrogen concentration estimator, wherein the detecting mechanism also communicates with the gas separator.

17. A fuel cell anode exhaust system for use in remediating an anode gas mixture and forming a remediated gas mixture, the system comprising:
   a fuel cell anode having an input and an output;
   a recirculating conduit loop communicating with the anode input and output;
   a remediating conduit loop having an input and an output, the input and output communicating with the recirculating conduit loop;
   a pump situated in the recirculating conduit loop;
   a gas separator disposed in the recirculating conduit loop and situated downstream and spaced apart from the pump, the gas separator having a unpurified gas portion, a purified gas portion, and a membrane disposed between the purified and unpurified portions, the gas separator being adapted to remediate the anode gas mixture when the anode gas mixture is received from the input of the remediating conduit loop into the unpurified gas portion forming the remediated gas mixture when the anode gas mixture passes through the membrane into the purified gas portion of the gas separator; and
   a signal generator communicating with the pump and gas separator, the pump being configured to receive a signal from the signal generator to maintain a first predetermined pressure range in the gas separator, wherein the gas separator is adapted to expel the anode gas mixture forming an expelled anode gas mixture at a second predetermined threshold gas pressure of the anode gas mixture, the system being adapted to conserve energy in the expelled anode gas mixture in a range of 30% to 60% relative to an open loop purging system.

18. The system of claim 17, wherein the signal generator includes at least one of a timer or a pressure detecting mechanism.

19. The system of claim 17, wherein the first predetermined pressure is a positive pressure.

20. The system of claim 19, wherein the positive pressure ranges from 5 bar to 7 bar.

* * * * *